June 7, 1927. 1,631,736
J. KIRNER
BEARING FOR SPINNING SPINDLES
Filed June 26, 1922
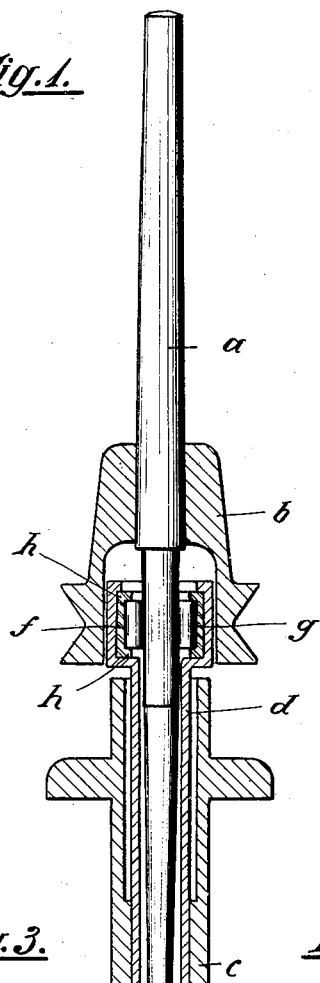
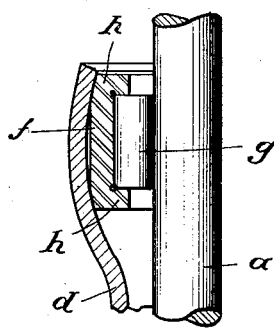
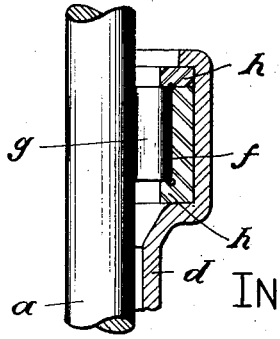
INVENTOR
Josef Kirner
By (signature)
Attorney.

Patented June 7, 1927.

1,631,736

UNITED STATES PATENT OFFICE.

JOSEF KIRNER, OF STUTTGART, GERMANY.

BEARING FOR SPINNING SPINDLES.

Application filed June 26, 1922, Serial No. 571,057, and in Germany July 28, 1921.

My invention has for its object to devise means for journalling spinning spindles in a novel and advantageous manner, and it particularly refers to means whereby roller bearings may be used more extensively in connection with devices of this kind.

In the construction of bearings for spinning spindles the sliding journal bearings are being supplanted recently by ball bearings. Roller bearings have not yet been employed for this purpose in view of the prevailing opinion that roller bearings are only suitable under very heavy loads in which ball bearings will not work satisfactorily on account of excessive pressure between the balls and the races, and because it was generally assumed that the greater amount of work and costs required for the manufacture of an exact roller bearing as compared with an exact ball bearing was a useless expense in connection with those kinds of bearings which are only slightly strained, such as the collar bearings for spinning spindles.

From recent experiments it has been ascertained that contrary to the former prevailing opinion of experts in this art, the employment of roller bearings for the upper collar bearing of spinning spindles is more advantageous and even cheaper than the use of ball bearings in view of the following facts.

In the employment of balls as revoluble bodies it is either necessary to provide special inner rings which on account of the high number of revolutions must be very carefully fastened, or the inner races have to be ground directly on to the spindles. In the latter case it also becomes indispensably necessary to harden the spindles at the points corresponding to the races in order to avoid very considerable wear or blistering of the inner race. Now, inasmuch as such hardening will always entail a certain bending of the spindles, the very expensive subsequent adjusting work for truly centering the spindle becomes necessary after the hardening operation.

If, however, rollers as revolving bodies are used in the roller bearing of the spindles, the surface pressure at the journalling point is so slight that the hardness of the ordinary sliding spindle is sufficient without any danger of impressions by the rollers at the points of movement. By this means one is enabled to run the existing spindles upon rollers which it was usual heretofore to operate with sliding journal bearings, and without the necessity of hardening them or of carefully truing the distorted contacting portion by subsequent careful grinding. It is obvious, therefore, that in this particular art the employment of roller bearings instead of the otherwise universally employed ball bearings is altogether more advantageous in every respect, though the bearing is subjected to a very slight load only.

The invention is shown on the accompanying drawing as embodied in spinning spindles in three modified forms of construction by way of example.

Figure 1 is an axial section through the bearing embodying my invention.

Figure 2 is a modified form of construction showing the means of securing the outer race of the roller bearing in a separate sleeve. Figure 3 is another modification showing the mounting of the roller bearing in the sleeve.

The spindle $a$ is provided with the usual sheave $b$ the groove of which is situated above the point of attachment of the collar bearing. In the foot $c$ of the spindle a sleeve $d$ is inserted at the bottom of which the step bearing $e$ is arranged, and the top portion of which surrounds the outer ring $f$ of the collar roller bearing with the rollers $g$. For the lateral guiding of the rollers the two annular flanges $h$ which are rigidly connected to the outer ring $f$ are provided.

The rollers $g$ are adapted to move directly upon the cylindrical portion of the collar bearing of the spindle $a$ which does not require any special treatment, and in particular no special hardening. Into the roller bearing the spindle $a$ may be inserted from above as with the ordinary collar bearing, and may be withdrawn therefrom in the same manner.

The sleeve $d$ is laterally supported preferably at its lower portion only so that it is capable of becoming spring actingly adjusted with its upper portion containing the collar bearing.

With a view of facilitating the process of manufacture at least one of the flanges of the roller bearing is preferably made separately, and is connected to the outer race $f$ by turning the sleeve inwards above it, for example by means of rolling or otherwise bending the ends of the sleeve.

It is also preferable to mount the outer ring of the roller bearing in an approximately spherical seat provided in the sleeve *d* which in the case of limited space may be recessed in its middle portion and admits of adjusting the roller bearing without the danger of jamming if the sleeve should become bent. Other modifications besides those herein illustrated will suggest themselves to persons skilled in the art, so as to suit different conditions of use and the requirements and convenience of the user, and without deviating from the spirit of my invention.

I claim:—

1. A support for spinning spindles comprising in combination, a holder adapted to receive the spindle, a bearing sleeve mounted in said holder, and an anti-friction bearing in said sleeve and surrounding the spindle, including a plurality of rollers coacting at their inner faces with the spindle, a ring surrounding said rollers and annular means at the ends of the ring and extending inwardly therefrom in coacting relation to the ends of the rollers to guide and prevent longitudinal displacement thereof.

2. A support for spinning spindles comprising in combination, a holder adapted to receive the spindle, a collar bearing surrounding said spindle comprising a plurality of anti-friction rollers having plano-end faces, said rollers coacting at their inner faces directly with the spindle, a ring surrounding said rollers and annular guide means at the ends of said rollers, and supporting means for said bearing surrounding the spindle, the ring and the annular guide means aforesaid.

3. A support for spinning spindles comprising in combination, a holder, a bearing sleeve disposed therein having a step bearing for the spindle, said sleeve having an enlarged bearing seat at its other end, and a collar bearing disposed in said seat comprising a plurality of rollers contacting with the spindle at their inner sides, and a retainer ring surrounding said rollers having inwardly flanged guide means at the end thereof, and means for preventing longitudinal displacement of the rollers.

4. A support for spinning spindles comprising in combination, a holder or support, a bearing sleeve disposed therein and spaced therefrom for a substantial portion of its length to permit relative movement therein, and a self-aligning bearing in said sleeve including a plurality of rollers contacting at their inner faces with the spindle, said bearing being shiftable with relation to the sleeve under stress applied to the spindle, whereby to maintain free parallel relationship between the contacting faces of the spindle and rollers.

5. A support for spinning spindles comprising in combination, a holder or support, a bearing sleeve disposed therein and spaced therefrom for a substantial portion of its length to permit relative movement therein, and a self-aligning bearing in said sleeve including a plurality of rollers contacting with the spindle at their inner faces and a retainer therefor having a spherically shaped external face coacting with a correspondingly formed face of the sleeve.

6. A support for spinning spindles comprising in combination, a bolster adapted to receive the spindle, and an anti-friction bearing mounted in said bolster and comprising a plurality of rollers surrounding the spindle and in contact therewith and annular guide means for the rollers coacting with the ends of the same and arranged in spaced relation to the spindle.

7. A unitary support for spinning spindles comprising a bolster adapted to receive the spindle, a step bearing for said spindle, and an anti-friction bearing cooperative with the spindle at a point between its ends, including a plurality of rollers contacting on their inner faces with the spindle, a retainer therefor in the bolster and surrounding the rollers, and annular guide means correspondingly extending over the ends of the rollers to guide the rollers and prevent longitudinal displacement thereof.

In testimony whereof I affix my signature

JOSEF KIRNER. [L. s.]